Jan. 7, 1964     G. E. MALLINCKRODT     3,116,932
ROLLING SEAL FOR PISTON
Filed July 27, 1961
FIG. 1.
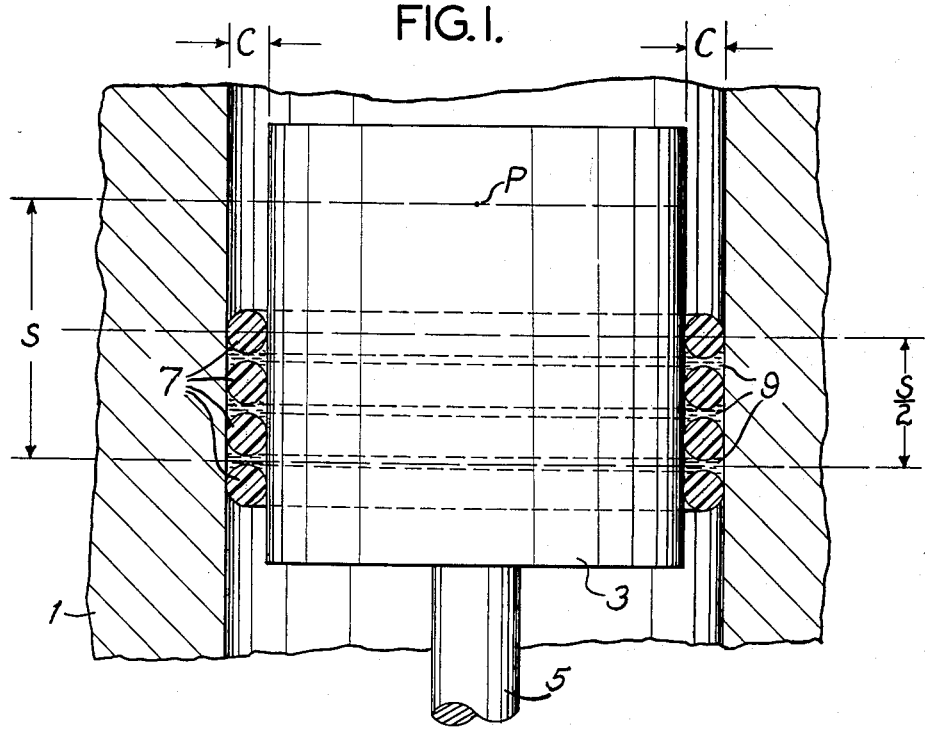
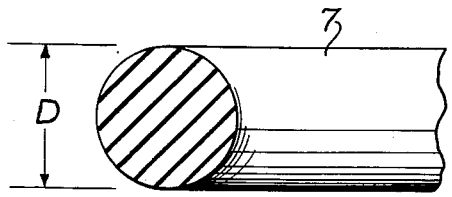
FIG. 2.
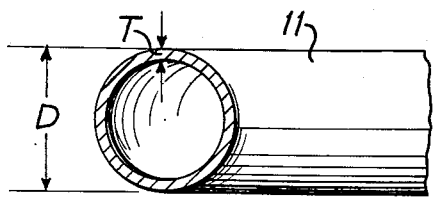
FIG. 3.

United States Patent Office 3,116,932
Patented Jan. 7, 1964

3,116,932
ROLLING SEAL FOR PISTON
George E. Mallinckrodt, St. Louis, Mo., assignor to Elliot Enterprises, Incorporated, St. Louis County, Mo., a corporation of Missouri
Filed July 27, 1961, Ser. No. 127,356
1 Claim. (Cl. 277—173)

This invention relates to seals, and with regard to certain more specific features, to an O-ring type of seal for reciprocating pistons, rods and the like.

Among the several objects of the invention may be noted the provision of an O-ring type of seal for reciprocating pistons, rods and the like, in which sliding action is avoided at the seal; and the provision of a seal of the class described, providing improved protection against leakage. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claim.

In the accompanying drawings, in which several of various possible embodiments of the invention are illustrated, FIG. 1 is a diagrammatic cross section illustrating the invention, parts being shown in elevation;

FIG. 2 is an enlarged detail section of one form of O-ring; and

FIG. 3 is a view similar to FIG. 2, showing another form of O-ring.

Corresponding reference characters indicate corresponding parts throughout the several views of the drawings.

Heretofore, each O-ring employed as a seal has been located in a groove, either in a male or female cylinder of such a pair of cylinders having relative translatory motion. The groove has been generally made somewhat wider in an axial direction than the free diameter of the O-ring material positioned therein, so that the ring has some freedom of toroidal rolling action on both cylinders. However, the axial extent of the groove has been insufficient to accommodate such rolling movement throughout the complete relative movement or so-called stroke between the cylinders. Thus, at the beginning of a stroke of movement, rolling action occurred as the O-ring moved from one end of the groove to the other, and thereafter sliding movement occurred between one of the cylinders and the O-ring. One of the features of the present invention is the avoidance of sliding movement of an O-ring during any part of the stroke of action between the cylinders, and another is to provide for compounding the number of O-rings used in a given seal, so that the seal will not blow out and also so that the sealing effect may be enhanced.

Referring now more particularly to the drawings, there is shown at numeral 1 a female cylinder in which is located a male cylinder or piston 3, carried on and guided by a piston rod 5. The piston 3 and rod 5 have stroking movements of substantial amount relative to the cylinder 1; for example, 2 inches. The cylindrical forms 1 and 3 are of diameters such as to establish a substantial clearance therebetween for acceptance of one or more O-rings, four of these being shown by way of example and numbered 7.

An axial section of one side of an O-ring 7 is shown in FIG. 2. Each O-ring may be composed of suitable resilient material such as oil-resistant rubber, nylon, Teflon or the like. The free cross section of the O-ring material is shown as circular in FIG. 2. The free diameter D of this cross section is slightly greater than the radial clearance C on each side of the piston. Therefore the O-ring section becomes slightly deformed when the rings 7 are in the positions shown in FIG. 1. The rings as assembled are spaced. In the spaces between them is carried a supply of a fluid such as water, oil or other suitable liquid 9. Although the invention contemplates the use of several O-rings such as 7, in some cases a single ring is sufficient. In the latter case, no fluid is employed. Although the O-rings 7 are illustrated as sealing a piston in a cylinder, it is to be understood that they may seal a piston rod or the like extending through any cylindrical opening.

A feature of the invention is that the O-ring or O-rings are not carried in any groove which in any way limits their toroidal rolling action throughout a complete operating stroke of the piston 3 relative to the cylinder 1. The stroke of the piston 3 is indicated for example by the distance S. Assuming that the piston 3 is in its uppermost position in FIG. 1, it will be seen that as it moves down so as to carry a point P thereon through the distance S, the uppermost O-ring 7 will move down a distance $$\frac{S}{2}$$

and each of the other O-rings 7 will move a like distance down the side wall of the cylinder 1. The piston 3 will have upper portions thereof move down within the girth of the O-ring assembly as rolled down. The lengths of the piston 3 and of the cylinder 1 are such that this may occur without any O-ring escaping from between them.

The number of O-rings employed depends upon the pressure to be contained. For a comparatively low pressure, a single ring such as the uppermost ring 7 may be used. It will function with pure rolling contact throughout a complete stroke of the piston 3. For higher pressures, there is a possibility that a single ring may be blown out from between the piston and cylinder walls. It is to avoid this contingency that additional rings are used. With the addition of each ring, two additional points of frictional resistance against blow-out are obtained.

It is undesirable that the side of any ring should rub upon the side of an adjacent ring during toroidal rolling action in connection with the cylinders 1 and 3. It is for this reason that the O-rings are spaced and fluid 9 used therebetween, preferably a liquid such as oil, water, mercury or the like. The liquid, being substantially incompressible, maintains a substantially constant spacing between the rings. If sufficient space can be afforded between rings 7, and each ring makes a sufficient seal against air leakage, the gaseous fluid in the form of air between rings will prevent approach to contact between ring pairs. The use of the trapped liquid is preferred, however.

In FIG. 3 is shown a hollow or tubular resilient type of O-ring 11 which may be substituted for the solid type of O-ring 7 shown in FIG. 2. For example, this may be composed of a high-strength steel, beryllium-copper or the like, which is capable of deforming from a circular cross section to an ovate cross section without breakage during rolling. Such a ring has the advantage that hysteresis lossess due to deformation during toroidal rolling action are less than in a softer, solid form of ring such as shown at 7. The wall dimension T should be sufficiently small, as compared to the diameter D, that the ring section may flex into a slightly ovate shape when the ring is installed in operating position.

It will be understood that in a given structure a variety of O-rings may be used of the forms such as shown in FIGS. 2 and 3, or all of them may be of either form, and that their number is determined by their total resistance to being blown out at a given pressure.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

In combination, a female cylinder, a male cylinder therein relatively reciprocable throughout a certain stroke, said cylinders having radial clearance therebetween, several resilient deformable and axially spaced O-rings located in said clearance, the spaces between O-rings being filled with a liquid, said cylinders being uninterrupted throughout lengths thereof adjacent the O-rings for sufficient distances to allow uninterrupted rolling of the O-rings on both cylinders during reciprocation throughout said stroke.

References Cited in the file of this patent

UNITED STATES PATENTS

| | | |
|---|---|---|
| 207,871 | Horton et al. | Sept. 10, 1878 |
| 1,761,123 | Gruver | June 3, 1930 |
| 2,501,944 | Jaeger et al. | Mar. 28, 1950 |
| 2,979,347 | Arutunoff | Apr. 11, 1961 |
| 3,007,600 | Horner | Nov. 7, 1961 |

FOREIGN PATENTS

| | | |
|---|---|---|
| 12,253 | Great Britain | 1848 |
| 158,709 | Great Britain | Feb. 14, 1921 |
| 612,836 | Germany | May 6, 1935 |
| 1,075,909 | Germany | Feb. 18, 1960 |